United States Patent
Wang

[11] Patent Number: 5,450,067
[45] Date of Patent: Sep. 12, 1995

[54] WATER LEVEL DETECTOR AND INDICATOR SYSTEM

[76] Inventor: Ping-Shin Wang, No. 22, Lane 21, San-Chung Rd., Nan-Kang Dist., Taipei, Taiwan

[21] Appl. No.: 230,743

[22] Filed: Apr. 21, 1994

[51] Int. Cl.$^6$ ............................................. G08B 21/00
[52] U.S. Cl. .................................... 340/620; 340/618; 73/304 R; 73/308
[58] Field of Search .............. 340/618, 620, 623, 624, 340/625; 73/304 R, 305, 307, 311, 317, 308

[56] References Cited
U.S. PATENT DOCUMENTS 3,155,952 11/1964 Boehm et al. .................... 340/625 X
4,371,790 2/1983 Manning et al. ................. 340/620 X
5,283,569 2/1994 Nelson ............................... 340/624 X Primary Examiner—Jeffery A. Hofsass
Attorney, Agent, or Firm—Bacon & Thomas

[57] ABSTRACT

A water level detector and indicator system includes a water level detector and a water level display controlled by the water level detector to give a respective output signal when the level of water changes from one position to another. The water level detector can be a mechanical type which uses a float to control a multi-step switch causing a series of indicator lamps to give light respectively. The water level detector can be an electronic type which uses metal probes to detect the change of water level, and a controller driven by the metal probes to control buzzers and indicator lamps to work.

4 Claims, 7 Drawing Sheets 5,450,067

WATER LEVEL DETECTOR AND INDICATOR SYSTEM

BACKGROUND OF THE INVENTION

The present invention relates to a water level detector and indicator system which shows the water level of a water reservoir step by step so that the users have sufficient time to take the necessary steps before the water reservoir is empty.

A water reservoir may be installed in a building for keeping water. When a water reservoir is installed, it must be properly sealed to prevent contamination. Once a water reservoir is sealed, it is difficult to know the existing amount of water contained in the water reservoir. In order to keep water be continuously and automatically supplied, a switch is commonly installed to control the water pump permitting it to pump water to the water reservoir when the level of water drops below the predetermined range. However, if the external water supply to the water reservoir is stopped, the water pump will run in idle when the level of water drops below the predetermined range, and the users can know the situation only when water in the water reservoir has been completely used up.

SUMMARY OF THE INVENTION

One object of the present invention is to provide a water level detector and indicator system which indicates the changes of water level in the water reservoir through indicator lamps by means of the operation of a float-controlled switch. Another object of the present invention is to provide a water level detector and indicator system which gives an alarm signal to the end-users when the level of water in the water reservoir drops below the predetermined alarm range.

DETAILED DESCRIPTION OF THE PREFERRED EMBODIMENT

Figure 1:
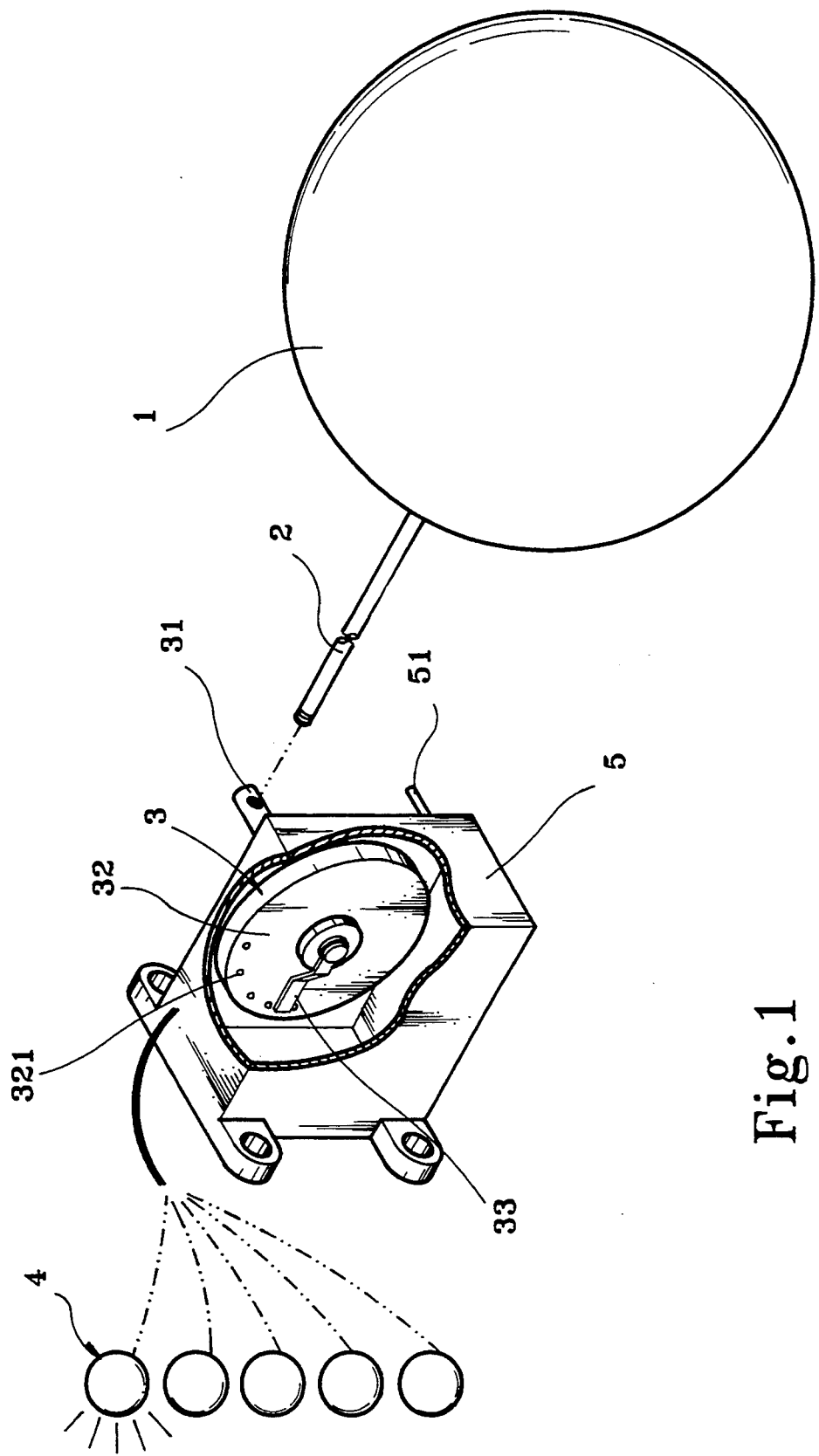
FIG. 1 shows a first mechanical water level detector and indicator system according to the present invention.

Referring to FIG. 1, therein illustrated is a first mechanical water level detector and indicator system according to the present invention, which is generally comprised of a float 1, a float arm 2, a switch 3, and a plurality of indicator lamps 4. The float 1 is fastened to the float arm 2 at one end. The opposite end of the float arm 2 is perpendicularly connected to a revolving shaft 31 on the switch 3. Therefore, the shaft 31 is turned as the float 1 is lowered. The switch 3 comprises a circular base 32 mounted on the shaft 31 by a bearing, having a plurality of switching points 321 on one side thereof around the border. The shaft 31 has one end coupled to the float arm 2, and an opposite end revolvably fastened to the circular base 32 of the switch 3 at the center by a bearing and coupled with a contact 33 at right angles. The switch 3 is received inside a water-proof casing 5. The indicator lamps 4 are respectively connected to either switching point 321 on the circular base 32 of the switch 3 by a respective electric wire for indicating a corresponding water level.

Figure 2:
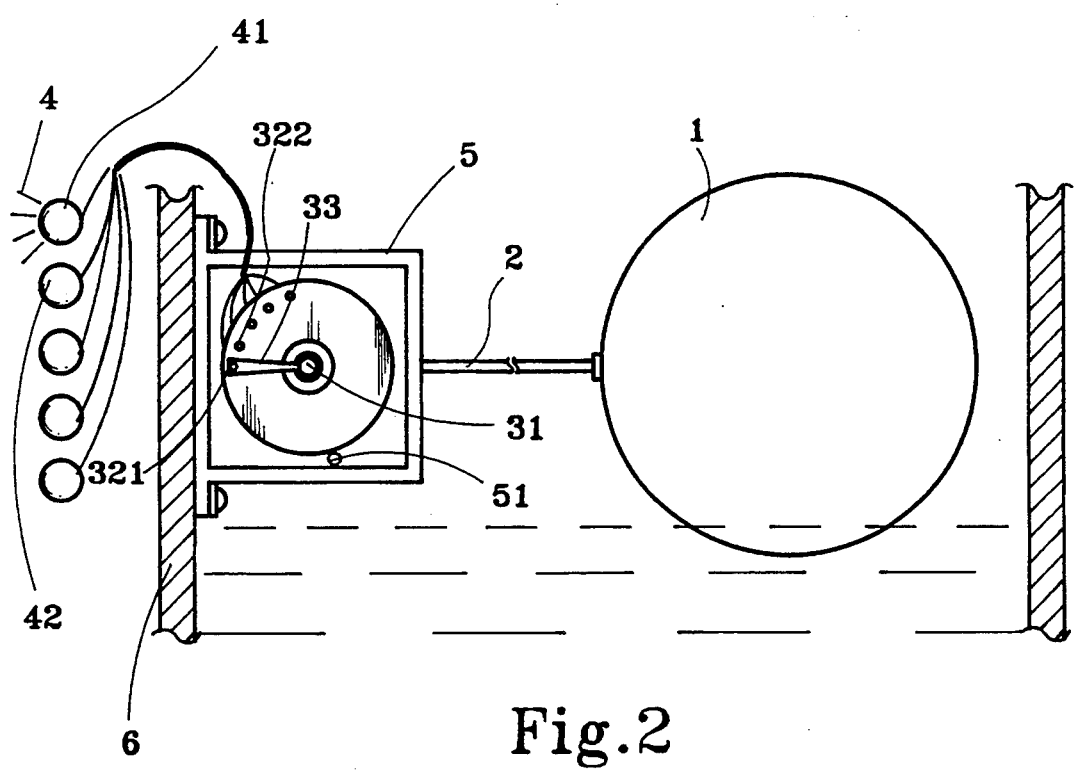
FIG. 2 shows the first mechanical water level detector and indicator system of FIG. 1 installed in the water reservoir.

Referring to FIG. 2, the casing 5 is fastened to the inside wall of a water reservoir 6 at a suitable elevation, preferably at the full water level. As the water level drops, the float 1 is lowered to turn the float arm 2 downwards, and the contact 33 of the revolving shaft 31 is moved to pass over the switching points 321 from one to another in triggering the corresponding indicator lamps 41. During the full water level stage, the contact 3 contacts the lowest switching point causing the corresponding indicator lamp 41 to give light. As the water level drops, the contact 321 is turned upwards to contact the next switching point, and the next indicator lamp 42 is turned on. Therefore, the user can know the current water level in the water reservoir 6 according to the indicator lamp being turned on. The contact 33 is made in the shape of a sector constantly maintained to contact either switching point, i.e. the contact 33 keeps in contact with one switching point 321 before it is moved to contact the next switching point 322, therefore there is always a corresponding indicator lamp being turned on. This arrangement eliminates possible vacant interval. Further, the casing 5 has a stop bar 51 disposed below the revolving shaft 31 to limit the down stroke of the float arm 2. If the float arm 2 is turned downwards to the vertical position. it will become stuck when the water reservoir is refilled to the full water level again. The arrangement of the stop bar 51 eliminates this problem.

Figure 3:
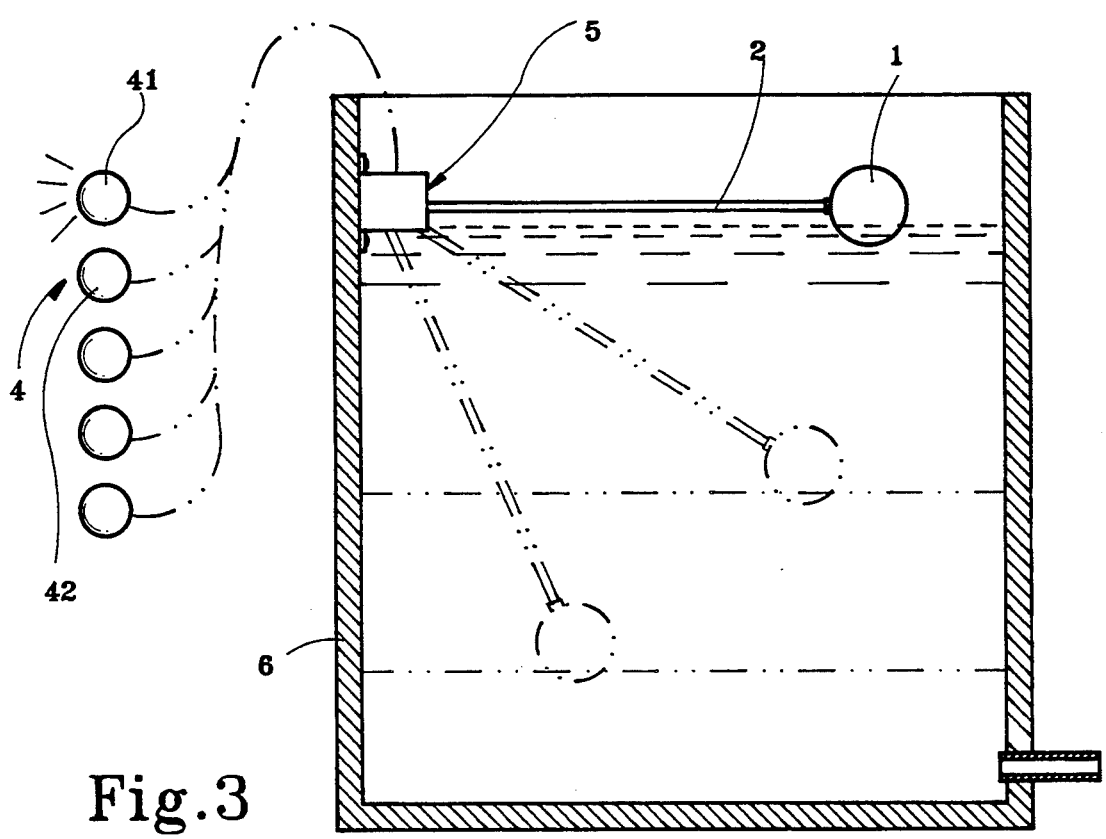
FIG. 3 shows the first mechanical water level detector and indicator system of FIG. 2 operated when the level of water changed.

Referring to FIG. 3, therein illustrated is an operational view showing the operation of the first mechanical water level detector and indicator system at different water levels.

Figure 4:
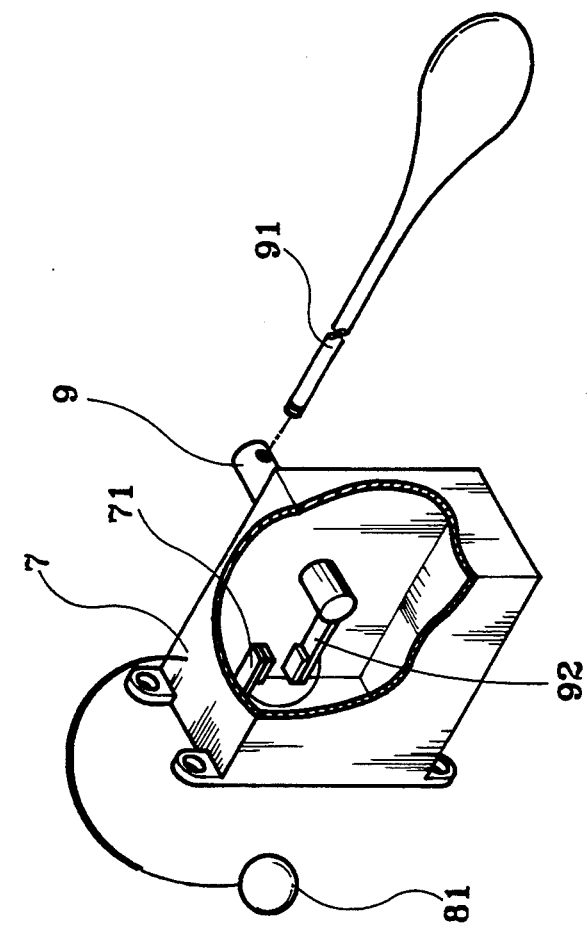
FIG. 4 shows a second mechanical water level detector and indicator system according to the present invention.
Figure 5:
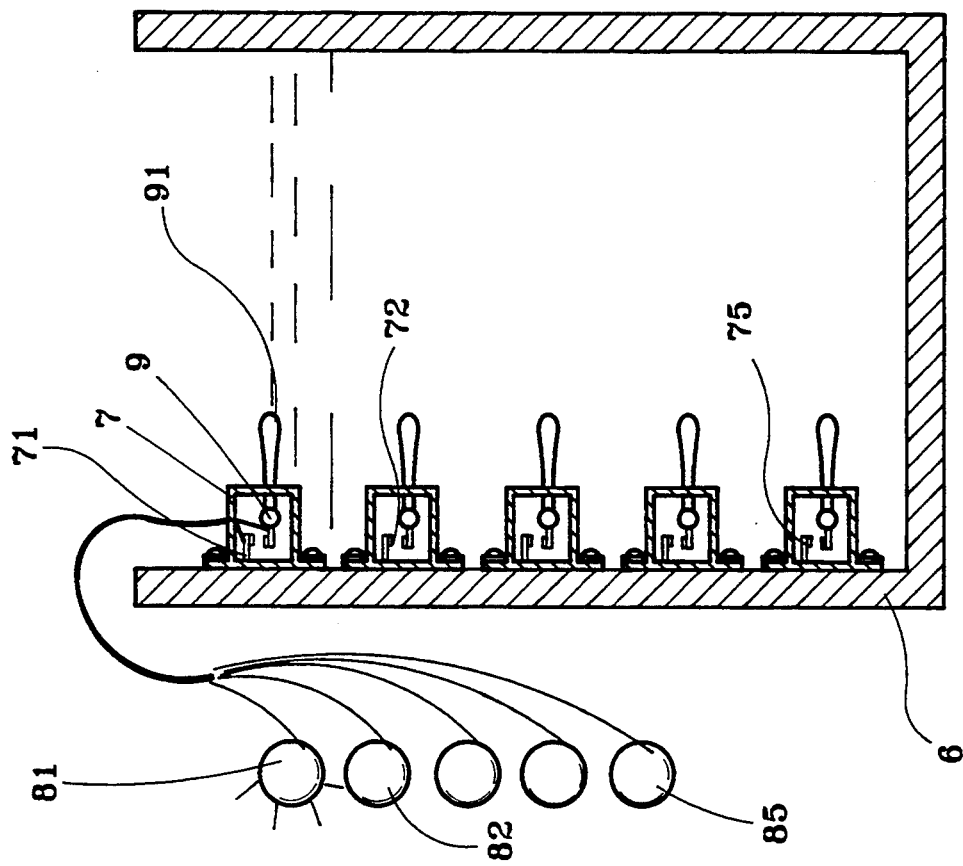
FIG. 5 shows the second mechanical water level detector and indicator system of FIG. 4 installed in the water reservoir.

Referring to FIGS. 4 and 5, therein illustrated is a second mechanical water level detector and indicator system of the present invention. As illustrated, several casings 7 are respectively fastened to the inside wall of the water reservoir 6 at different elevations. Each casing comprises a revolving shaft 9 driven by a respective float arm 91 to turn a respective contact 92, and a switching point 71, 72, . . . or 75 connected to a respective indicator lamp 81, 82, . . . or 85. When at the full water level, the float arm 91 of the casing at the top is floated upwards to disconnect the contact 92 from the respective switching point 71, and therefore the corresponding indicator lamp 81 is turned off. If the water level falls below the casing at the top, the float arm 91 is lowered, causing contact of the contact 92 with the switching point 71 in the respective casing 7, and therefore the corresponding indicator lamp 81 is turned on to give light. In the same manner, the next indicator lamp 82 will be turned on as the water level drops below the next casing. When the indicator lamps 81, 82, . . . 85 are all turned on, it shows that the water level has been dropped below the predetermined alarm range. On the contrary, the indicator lamps will be turned off one after another as the water level of the water reservoir is increased from the low water level to the high water level.

As indicated, when the water level drops below the predetermined water level causing the first indicator lamp 41:81, the water pump of the water reservoir will be automatically turned on to pump water to the water reservoir. When the water level surpasses the predetermined water level, the first indicator lamp 41:81 will be turned off again. If the first indicator lamp 41:81 keeps giving light or the next indicator lamp 42:82 is turned on under this stage, it means that the motor was damaged or the supply of water was stopped. If the motor was damaged, it should be quickly repaired. In case the supply of water was stopped, the motor should be immediately turned off to prevent idle running. Furthermore, the length of the float arm 2 may be made adjustable; the number of switching points 321 may be determined according to the capacity of the water reservoir.

Figure 6:
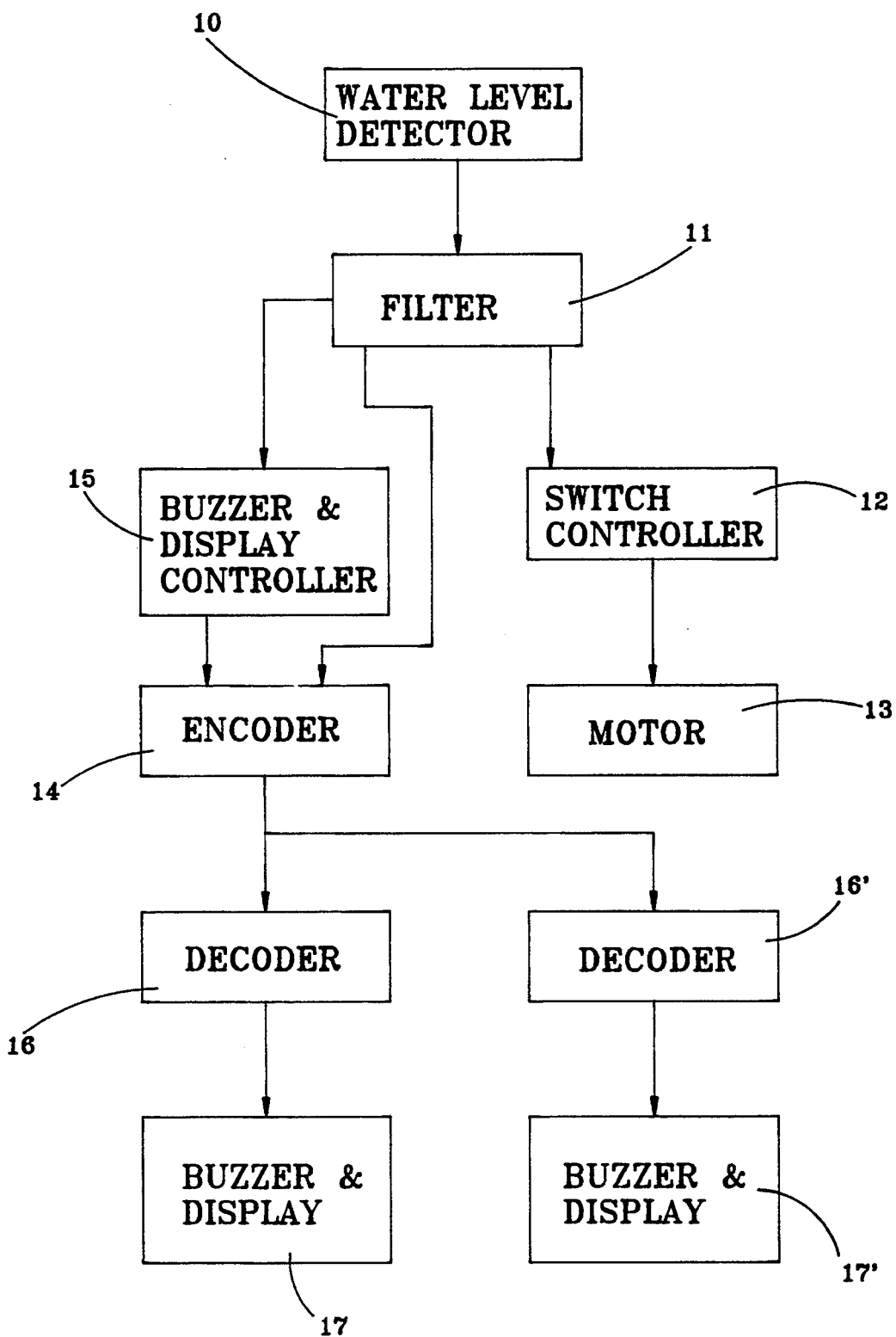
FIG. 6 is a block diagram of an electronic type water level detector and indicator system according to the present invention.
Figure 7:
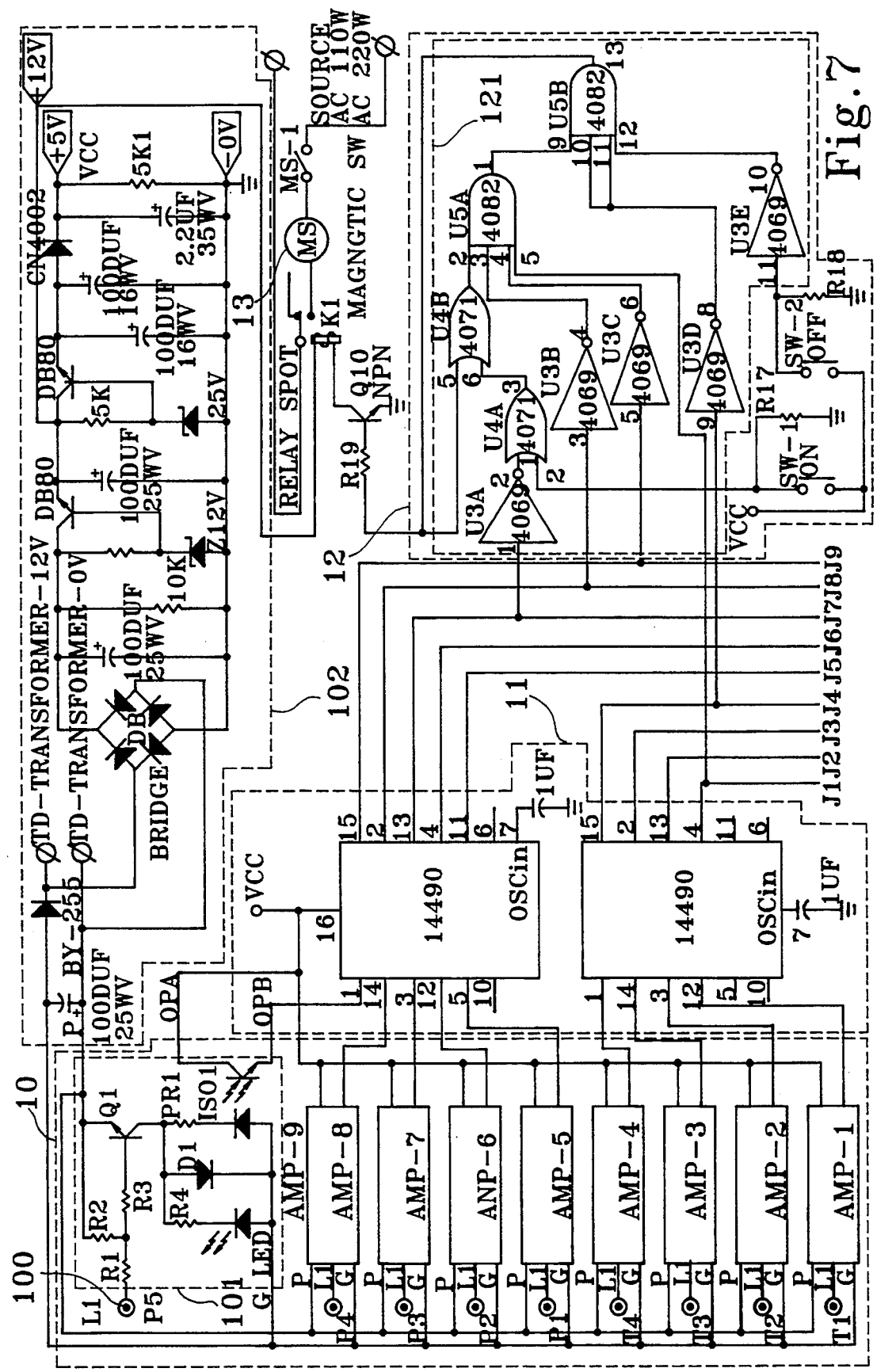
FIG. 7 is a partial circuit diagram for the electronic type water level detector and indicator system shown in FIG. 6, showing the control of the water level detector and the motor.

Referring to FIGS. 6 and 7, a water level detector and indicator system of the present invention can be an electronic type. The water level of the water reservoir is detected by a water level detector 10. The water level detector 10 comprises a plurality of metal probes 100 disposed in the water reservoir at different elevations to detect different levels of water, and a plurality of amplifiers 101 to amplify the signal from either metal probe 100. The signal from either amplifier 101 of the water level detector 10 is then treated through a filter 11 to remove noises. The output signal from the filter 11 is sent to a switch control 12 and an encoder 14 respectively. The switch control 12 automatically turns on a motor 13, upon receipt of the signal from the filter 11, causing it to pump water to the water reservoir. By means of the priority control of a logic circuit 121, the motor 13 can be turned on manually through a manual switch SW-1 or turned off manually through a manual switch SW-2. Therefore, the motor 13 can be turned off manually to prevent idle running when there is no water supply. Further, the DC power supply circuit 102, as shown in FIG. 7, provides the electronic type water level detector and indicator system with the necessary working voltage.

Figure 8:
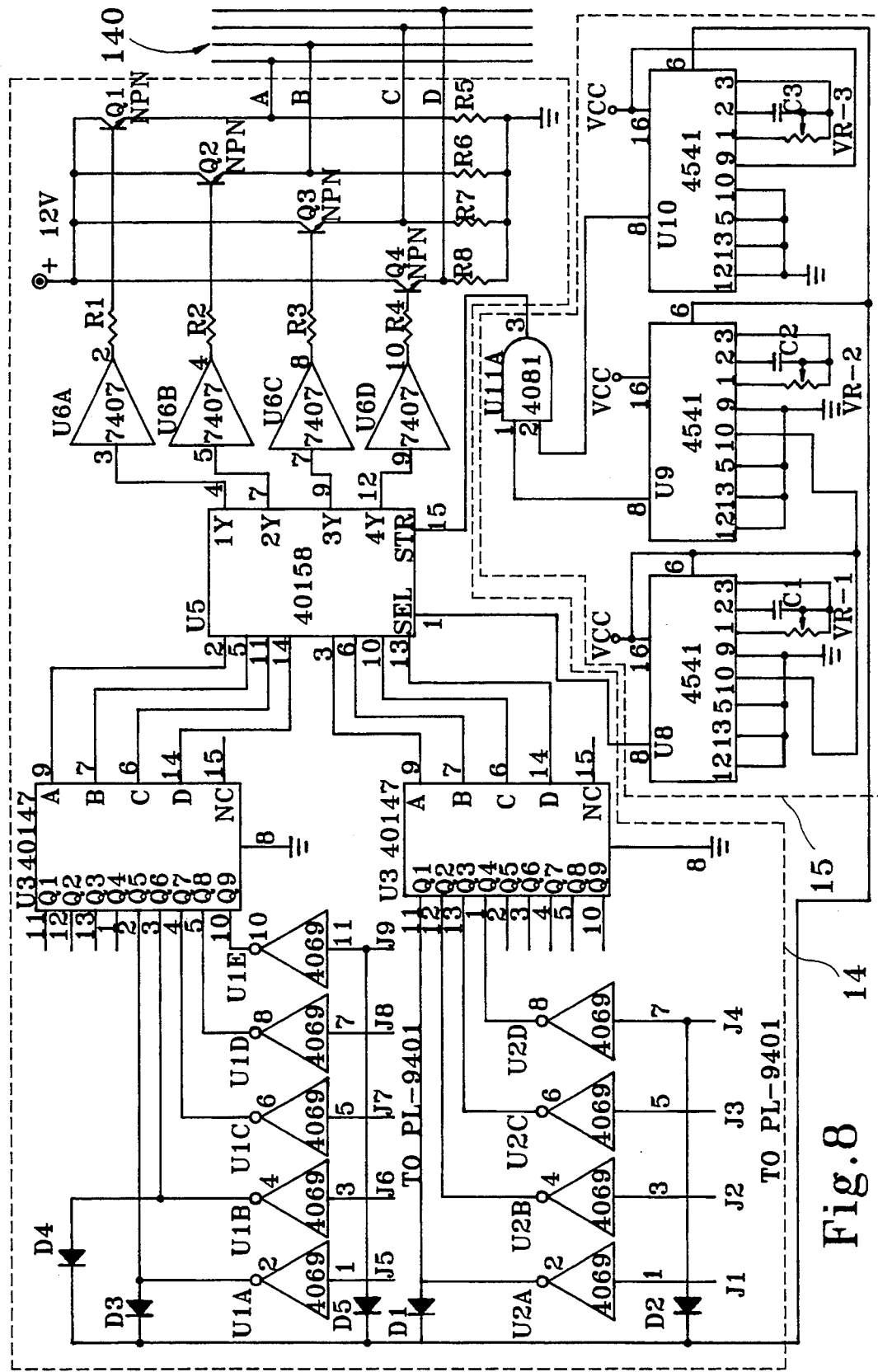
FIG. 8 is another partial circuit diagram for the electronic type water level detector and indicator system shown in FIG. 6, showing the encoding procedure of the detected signal.
Figure 9:
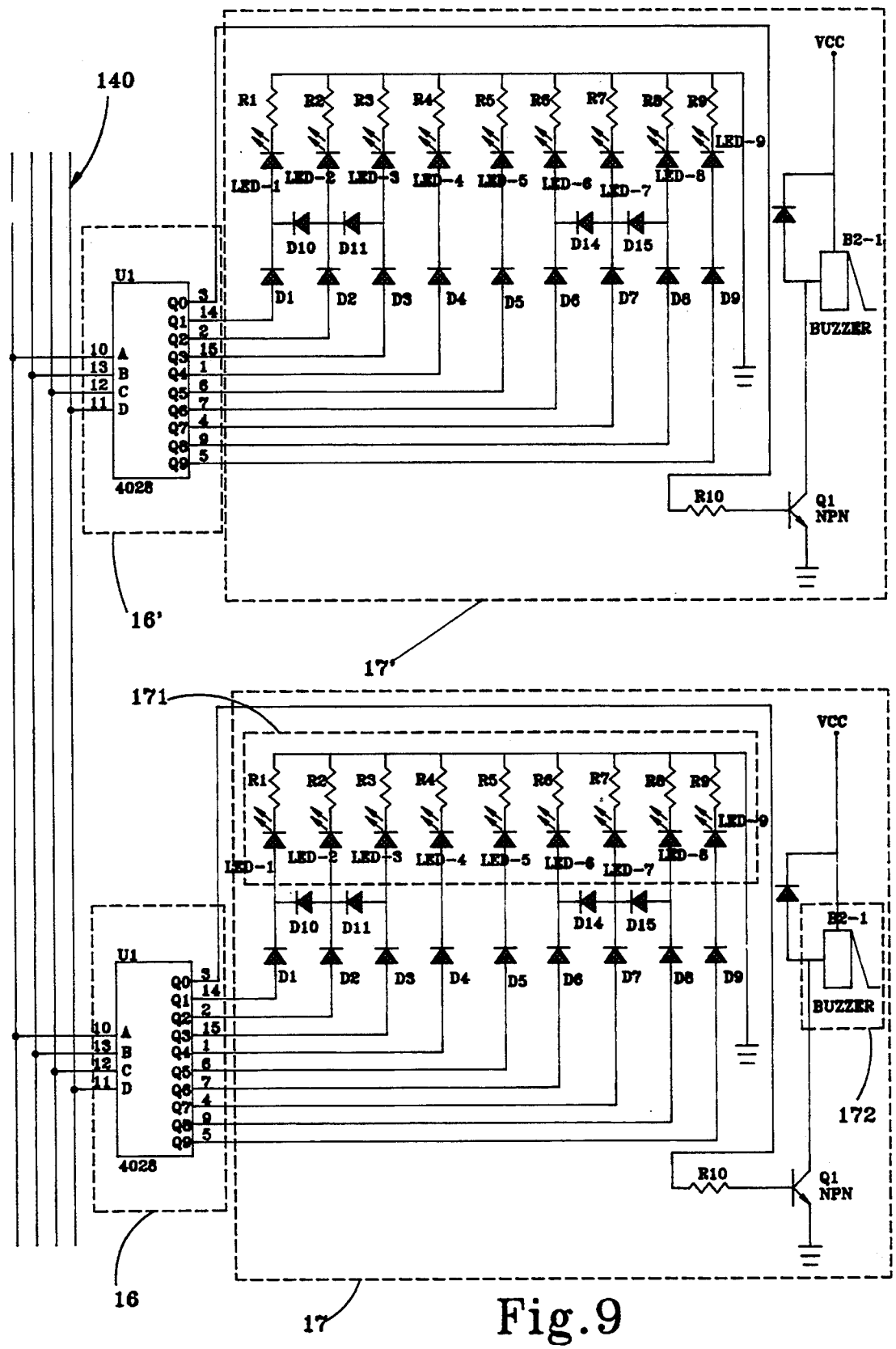
FIG. 9 is still another partial circuit diagram for the electronic type water level detector and indicator system shown in FIG. 6, showing the decoding procedure and the output of the buzzer and display.

Referring to FIGS. 8 and 9 and FIG. 6 again, the encoder 14 puts the signal from the filter 11 into a four-bit code and then sends it to the end-users. The encoder 14 also receives the output control signal from a buzzer and display controller 15. The buzzer and display controller 15 is comprised of time control IC 4541 U8, U9, U10, capacitors C1, C2, C3 and variable resistors VR-1, VR-2, VR-3 for controlling charging and discharging time so that the alternative operation of the buzzer and display circuit 17, 17' (see FIG. 9) is controlled. The time control IC U8 controls the flashing cycle of the display 171; the time control TC U9 controls the time of buzzing of the buzzer 172. The alternative operation of the buzzer 172 and the display 171 is controlled by the time control IC U10. When the water level of the water reservoir drops below the predetermined alarm range, either amplifier AMP-4 or AMP-9 (see FIG. 7) gives an output signal causing the display 171 and the buzzer 172 to work.

Referring to FIGS. 6 and 9 again, the four-bit code of the output of the encoder 14 is sent to the end-users through a bus line BUS 140. Decoders 16,16' and buzzer and display circuits 17,17' are installed in the end-users. The decoders 16,16' decodes the signal from the encoder 14 for driving the buzzer and display circuits 17,17'. The display 171 consists of a plurality of light emitting diodes respectively connected to the aforesaid metal probes 100. The measure of encoding the detected signal and then decoding it for output is to improve signal transmission efficiency. The arrangement of the bus line is for equivalent signal output to all end-users in the most efficient way.

While only few embodiments of the present invention have been shown and described, it will be understood that various modifications and changes could be made without departing from the spirit and scope of the invention.

I claim:

1. A water level detector and indicator system comprising:
   a plurality of metal probes disposed inside a water reservoir at different elevations to detect the level of water in said water reservoir;
   a water level detector circuit connected to the plurality of metal probes, the circuit having a plurality of amplifiers receiving detected signals from the probes to amplify the detected signal from the metal probes and to provide a corresponding first output signal;
   a buzzer and display controller to receive the output signal of said water level detector circuit and to provide a control signal;
   a filter to receive the first output signal of said water level detector circuit and generate a second output signal;
   a switch controller to receive the second output signal from said filter, said switch controller comprising a manual control switch and a logic circuit for determining the priority of the output signal of said filter and said manual control switch;
   an encoder to receive the output signal from said filter and the control signal from said buzzer and display controller and to generate a third output signal;
   at least one decoder to decode the third output signal from said encoder; and
   a buzzer and display circuit having at least one buzzer and at least one display controlled by said third output signal from the at least one decoder to give an audio output signal and a visual output signal respectively.

2. The water level detector and indicator system of claim 1 wherein said filter comprises a plurality of filter ICs to remove noise from the detected signal.

3. The water level detector and indicator system of claim 1 wherein said logic circuit determines the priority of the output signal of said manual control switch over the output signal of said filter.

4. The water level detector and indicator system of claim 1 wherein said at least one display comprises a plurality of light emitting diodes, the number of light emitting diodes being equal to the number of said metal probes.

* * * * *